(12) United States Patent
Shin et al.

(10) Patent No.: US 9,984,145 B2
(45) Date of Patent: May 29, 2018

(54) LATENT STUDENT CLUSTERING USING A HIERARCHICAL BLOCK CLUSTERING METHOD

(71) Applicant: Conduent Business Services, LLC, Dallas, TX (US)

(72) Inventors: Helen H. Shin, Fairport, NY (US); William K. Stumbo, Fairport, NY (US)

(73) Assignee: CONDUENT BUSINESS SERVICES, LLC, Dallas, TX (US)

(*) Notice: Subject to any disclaimer, the term of this patent is extended or adjusted under 35 U.S.C. 154(b) by 353 days.

(21) Appl. No.: 14/922,582

(22) Filed: Oct. 26, 2015

(65) Prior Publication Data

US 2017/0116316 A1    Apr. 27, 2017

(51) Int. Cl.
*G06F 17/30* (2006.01)

(52) U.S. Cl.
CPC .............................. *G06F 17/30598* (2013.01)

(58) Field of Classification Search
CPC ..... G06F 17/30598; G06F 17/30; G06F 17/00
USPC .................................................. 707/600–899
See application file for complete search history.

(56) References Cited

U.S. PATENT DOCUMENTS

| 8,718,534 B2 | 5/2014 | Srinivas et al. | |
| 2008/0180475 A1* | 7/2008 | Eldar | H04N 1/405 347/13 |

OTHER PUBLICATIONS

Dhillon, "Co-clustering Documents and Words Using Bipartite Spectral Graph Partitioning", KDD 2001 San Francisco, CA, US, 6 pgs.

* cited by examiner

*Primary Examiner* — Isaac M Woo
(74) *Attorney, Agent, or Firm* — Fay Sharpe LLP

(57) ABSTRACT

The present disclosure relates to a system for verifying homogeneity in clusters and comprises a processor and a non-transitory computer readable memory storing instructions that are executable by the processor. The system creates at least one adjacency matrix representing a relationship between rows and columns of a table. The system applies an algorithm to the table to identify a first set of clusters. For each identified cluster, the system compares a computed dispersion value to a predetermined threshold. The cluster is associated as being homogeneous if the threshold is not met and not homogeneous if the threshold is met. The system reapplies the algorithm to the set of non-homogenous clusters within the data set and repeats the thresholding processes until each cluster resulting from the data set is homogeneous. Upon reaching the desired homogeneity for each cluster, the system recombines the clusters sequentially while keeping the each identified cluster together.

24 Claims, 7 Drawing Sheets

LOCAL CLUSTERING OF CLUSTER 58 (FIGURE 5)

FIG. 6

FINAL CLUSTERED

FIG. 7

LATENT STUDENT CLUSTERING USING A HIERARCHICAL BLOCK CLUSTERING METHOD

BACKGROUND

The present disclosure is directed toward a system and method for simultaneously clustering multiple data sets and verifying homogeneity in the generated clusters. The system finds application in educational recommendation systems, but there is no limitation made herein to the type of data sets applied to the disclosed algorithms.

In the past few years, school districts have begun to use educational recommendation methods and systems for a number of benefits. These systems generally employ the various functionalities of multifunction devices ("MFDs"), such as copiers including scanning capabilities, to analyze the results of tests administered to students. The conventional system can automatically lift the student's answers from an answer sheet—after scanning in the answer sheet—and, in certain approaches, use a stored rubric to evaluate and score the results. Such a system enables the teacher to devote more learning time to students, which the teacher would otherwise spend manually grading the sheets. As educational recommendation systems advanced in the past few years, the systems can also use the results to customize the curriculum of students in need of specialized instruction and/or teacher-assistance.

In the current educational assessment and/or recommendation system (hereinafter collectively referred to as "ERS"), cluster analysis is performed to create appropriate groupings of students for a specific purpose—such as, e.g., balancing a classroom, identifying groups of students needing specialized intervention, and determining the range of abilities among students in a classroom, etc. The current ERS automates this process so the teacher has more time to focus its attention on matters of higher priority. Generally, current approaches for clustering use k-means and hierarchical clustering algorithms to find optimal partitions within a data set.

Current ERSs can also scale the groupings of students in the balanced classroom(s) to smaller sets. One exemplary goal of such scaling operation is to create peer learning groups where stronger students are paired with weaker students for working together on an exercise. In different embodiments, students can instead be grouped by instructional level so the teacher can focus on personalized instruction.

The algorithms required to create personalized clusters become more complex where each student is linked to a combination of parameters ("multiple sets of data") representing, for example, ability, performance, characteristics (s.a., age and gender, etc.). The challenge for creating homogeneous clusters increases when multiple parameters are considered for the clustering students. There is desired an approach for clustering students that can treat two sets of data simultaneously. More specifically, a clustering method is desired which generates homogeneous clusters. In addition to generating clusters, there is further desired an approach that can define characteristics of the cluster for addressing a goal of such system.

INCORPORATION BY REFERENCE

The disclosure of commonly assigned U.S. Pat. No. 8,718,534, entitled, "System for Co-Clustering of Student Assessment Data", by Srinivas, et al., is totally incorporated herein by reference.

The disclosure of "Co-clustering documents and words using Bipartite Spectral Graph Partitioning", by Inderjit S. Dhillon, K D D 2001, is totally incorporated herein by reference.

BRIEF DESCRIPTION

The present disclosure relates to a system for verifying homogeneity in clusters. The system comprises a processor and a non-transitory computer readable memory storing instructions that are executable by the processor. Particularly, the system includes an adjacency mapping module that creates at least one adjacency matrix representing a relationship between rows and columns of a table. The system includes a co-clustering module that applies an algorithm to the table to identify a first set of clusters. The clustering module is further operative to compute for each identified cluster a dispersion value of the cluster. For the each identified cluster, the module compares the dispersion value to a predetermined threshold. In response to the dispersion value being less than threshold, the module associates the cluster as being homogeneous. In response to the dispersion value is greater than or equal to the predetermined threshold, the module associates the cluster as not being homogeneous. The module continues applying the algorithm to the set of non-homogenous clusters within the data set to regroup the clusters. The system recomputes the dispersion value and then repeats the thresholding processes until each cluster resulting from the data set is homogeneous.

The present disclosure also relates to a method for verifying homogeneity in clusters. The method includes computing for each identified cluster a dispersion value of the cluster. For the each identified cluster, the method includes comparing the dispersion value to a predetermined threshold. In response to the dispersion value being less than the predetermined threshold, the method includes associating the cluster as being homogeneous. In response to the dispersion value being greater than or equal to the predetermined threshold, the method includes associating the cluster as not being homogeneous. The method further includes continuing the applying of the algorithm to the set of non-homogenous clusters within the data set to regroup the clusters. The method repeats until each cluster resulting from the data set is homogeneous.

The present disclosure also relates to a system for educational assessment of student groups. The system comprises a processor and a non-transitory computer readable memory storing instructions that are executable by the processor to include an adjacency mapping module. The adjacency mapping module creates at least one adjacency matrix representing a relationship between student data and assessment data. The assessment data includes metadata corresponding with an associated educational concept. The system comprises a co-clustering module that applies an algorithm to the student and assessment data to identify a first set of clusters. The clustering module further computes for each identified cluster a dispersion value of the cluster. For the each identified cluster, the module compares the dispersion value to a predetermined threshold. In response to the dispersion value being less than the predetermined threshold, the module associates the cluster as being homogeneous. In response to the dispersion value being greater than or equal to the predetermined threshold, the module associates the cluster as not being homogeneous. The module continues applying the algorithm to the clusters that are identified as not being homogeneous in the data set to regroup the clusters. The system recomputes the dispersion value and the repeats the thresholding process until each cluster resulting from the algorithm is a homogeneous cluster. For the each homogeneous cluster, the system determines the associated educational concept that students in the corresponding cluster struggle with.

BRIEF DESCRIPTION OF THE DRAWINGS

FIGS. 5A-5D show various numbers of clusters generated from the ERS using the adjacency matrix of FIG. 4.

FIG. 6 shows a localized matrix representing the reclustering results generated from a nonhomogeneous cluster originally represented in FIG. 5.

FIG. 7 shows five total clusters generated from the original adjacency matrix of FIG. 3.

DETAILED DESCRIPTION

Figure 1:
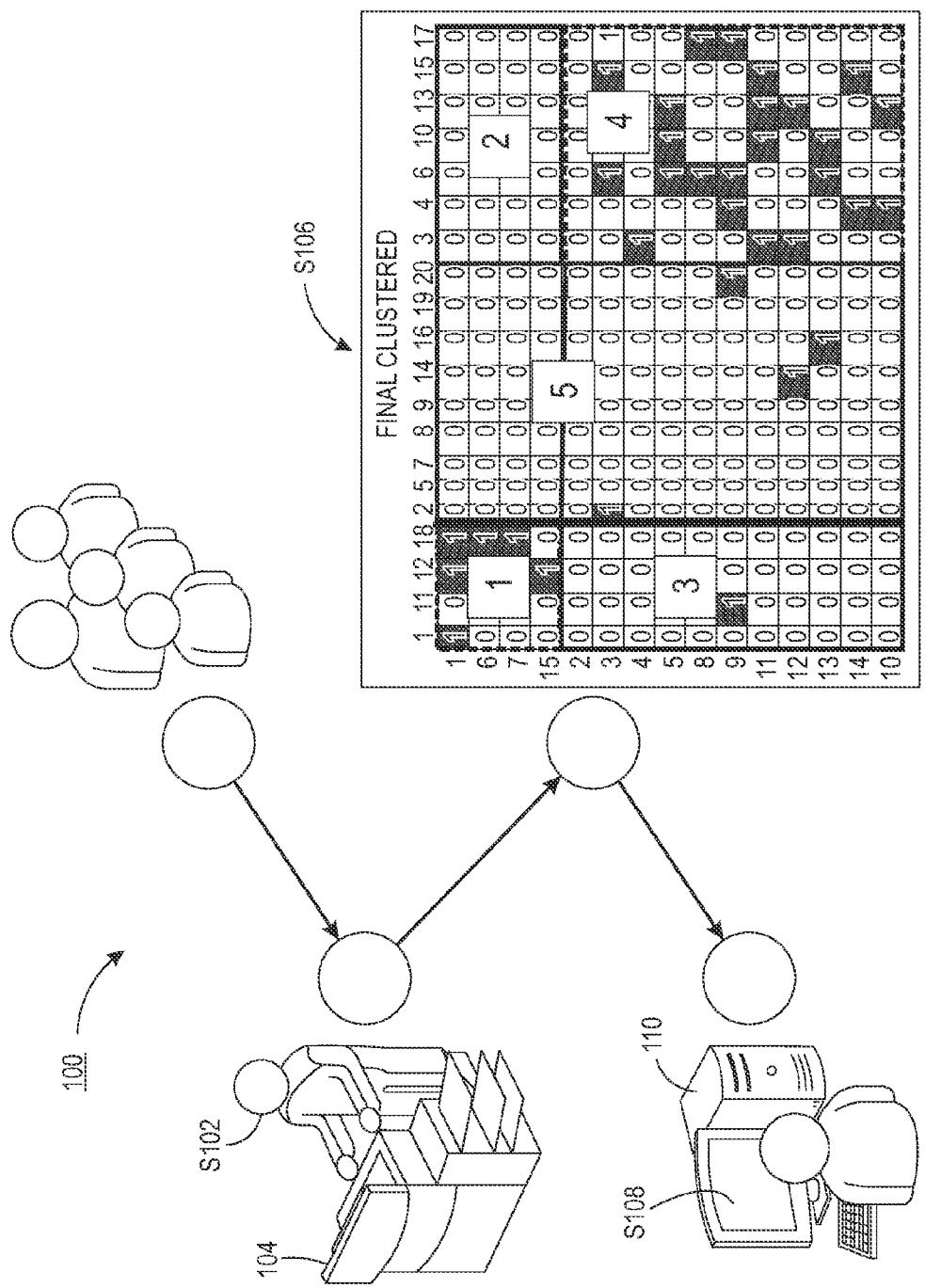
FIG. 1 is one aspect of an exemplary educational assessment system according to the present disclosure.

The present disclosure is directed towards an automatic student assessment grouping system that uses a hierarchical block clustering method, based on latent block models. An algorithm is disclosed which considers students and assessment items ("data") at the same time. The system and method permutes the data into homogeneous clusters. After each block is determined globally, an additional permutation is performed for all blocks that did not converge. Such blocks are identified as having an error rate that is greater than or equal to a predefined threshold value. One aspect of the iterative clustering approach is that it permits flexible boundaries between students and assessment items. In other words, the clusters output by the system and method disclosed herein may be different sizes to achieve the homogenous results.

One or more implementations of the present disclosure will now be described with reference to the attached drawings, wherein like reference numerals are used to refer to like elements throughout.

Referring to the drawings, FIG. 1 shows an illustration of an ERS 100 in accordance with the present disclosure. An educator, teacher, administrator and/or other user ("user") may utilize system 100. At S102, the user can automatically scan in or manually enter the data from the assessments into MFD 104. The MFD 104 can convert the scanned assessment into a Page Description Language File, image data, and/or other format. MFD 104 and the MFD or a server computer (not shown) may perform processing on the scanned assessments. At S106, the assessments are evaluated—i.e., an algorithm (not depicted) scores the assessments using a rubric (not depicted). The results of the scored assessments are associated with at least one data set. The system 100 co-clusters the students into groups using the data set while treating the students as a second data set. The system notifies the user at S108 of the clusters via a display at the user device 110. In other embodiments, S102-S108 may vary in sequence, may be performed in a serial manner or a parallel manner, and/or may be performed in a step-wise manner.

Figure 2:
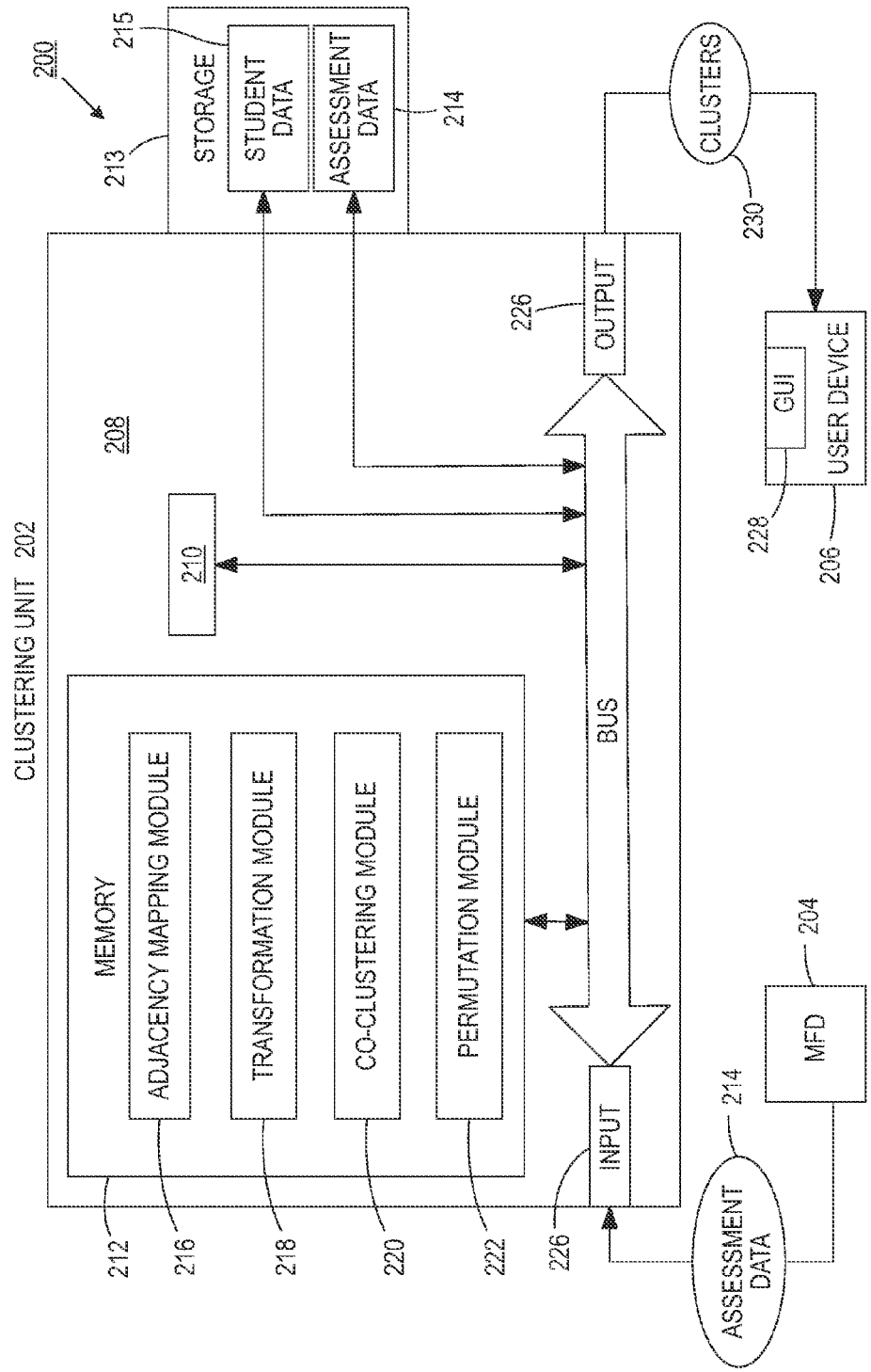
FIG. 2 is a schematic illustration of a system for generating homogeneous clusters and characteristic information.

FIG. 2 is a schematic illustration of an ERS 200 ("system 200") for generating clusters and characteristic information. The system 200 includes a clustering unit 202 and/or an MFD 204, including a scanner among other capabilities, which can be linked together by communication links, referred to herein as a network. In one embodiment, the system 200 may be in further communication with a user device 206. These components are described in greater detail below.

The clustering unit 202 illustrated in FIG. 2 includes a controller 208 that is part of or associated with the clustering unit 202. The exemplary controller 208 is adapted for controlling an analysis of assessment data received by the system 200 and clustering the students based on the assessment data, among other factors. The controller 208 includes a processor 210, which controls the overall operation of the clustering unit 202 by execution of processing instructions that are stored in memory 212 connected to the processor 210.

The memory 212 may represent any type of tangible computer readable medium such as random access memory (RAM), read only memory (ROM), magnetic disk or tape, optical disk, flash memory, or holographic memory. In one embodiment, the memory 212 comprises a combination of random access memory and read only memory. The digital processor 210 can be variously embodied, such as by a single-core processor, a dual-core processor (or more generally by a multiple-core processor), a digital processor and cooperating math coprocessor, a digital controller, or the like. The digital processor, in addition to controlling the operation of the clustering unit 202, executes instructions stored in memory 212 for performing the parts of the method outlined in FIG. 3. In some embodiments, the processor 210 and memory 212 may be combined in a single chip.

The clustering unit 202 may be embodied in a networked device, such as the MFD 204, although it is also contemplated that the clustering unit 202 may be located elsewhere on a network to which the system 100 is connected, such as on a central server, a networked computer, or the like, or distributed throughout the network or otherwise accessible thereto. In other words, the processing can be performed within the MFD 204 on site or in a central processing offline or server computer after transferring the electronic images corresponding to the scanned assessment sheets through a network. In one embodiment, the MFD 204 can be adapted to relay and/or transmit the scanned assessment sheet data ("assessment data") to the clustering unit 202. In another embodiment, the assessment data 214 may be input from any suitable source, such as a workstation, a database, a memory storage device, such as a disk, or the like, such as, for example, the database or storage 213 connected to or in communication with the clustering unit 202.

The stages disclosed herein are performed by the processor 210 according to the instructions contained in the memory 212. In particular, the memory 212 stores an adjacency mapping module 216 that creates at least one adjacency matrix representing a relationship between rows and columns of a table; a transformation module 218 that creates bipartite graphs using the table; a co-clustering module 220 that applies an algorithm to the table to identify a first set of clusters and iteratively applies the algorithm to the non-homogeneous clusters within the set until each cluster is homogeneous; and a permutation module 222 that recombines the clusters sequentially while keeping the each identified cluster together. Embodiments are contemplated wherein these instructions can be stored in a single module or as multiple modules embodied in different devices. The modules 216-222 will be later described with reference to the exemplary method.

The software modules as used herein, are intended to encompass any collection or set of instructions executable by the clustering unit 202 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the clustering unit 202 may be all connected by a bus 224.

With continued reference to FIG. 2, the clustering unit 202 also includes one or more communication interfaces 226, such as network interfaces, for communicating with external devices. The communication interfaces 226 may include, for example, a modem, a router, a cable, and and/or Ethernet port, etc. The communication interfaces 226 are adapted to receive the assessment data 214 as input.

The clustering unit 202 may include one or more special purpose or general purpose computing devices, such as a server computer, controller, or any other computing device capable of executing instructions for performing the exemplary method.

FIG. 2 further illustrates the clustering unit 202 connected to the MFD 204, including a scanner, for capturing and/or providing the assessment data 214 in electronic format. The assessment data 214 undergoes processing by the clustering unit 202 output the clusters 230. However, to generate the clusters, the clustering unit 202 also needs a second set of data. In the illustrative embodiment, the second set of data includes student data 215. The student data 215 can be provided to the clustering unit 202 via the MFD 204, for example, entered by the user via touchscreen or keyboard at the MFD. Alternatively, the student data 215 can be extracted from the scanned assessments. In another embodiment, the student data can be provided by the user at, and transmitted from, the user device 206. In one embodiment, the student data and assessment data can be stored in a database or storage device 213 included in or in communication with the clustering unit 202.

Furthermore, the system 200 can display the clusters and/or desired output in a suitable form on a graphic user interface (GUI) 228 at the user device 206. The GUI 228 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 210. Furthermore, in one contemplated embodiment, the clusters information can be transmitted to another computer application, which can perform additional processing on the clusters.

Figure 3:
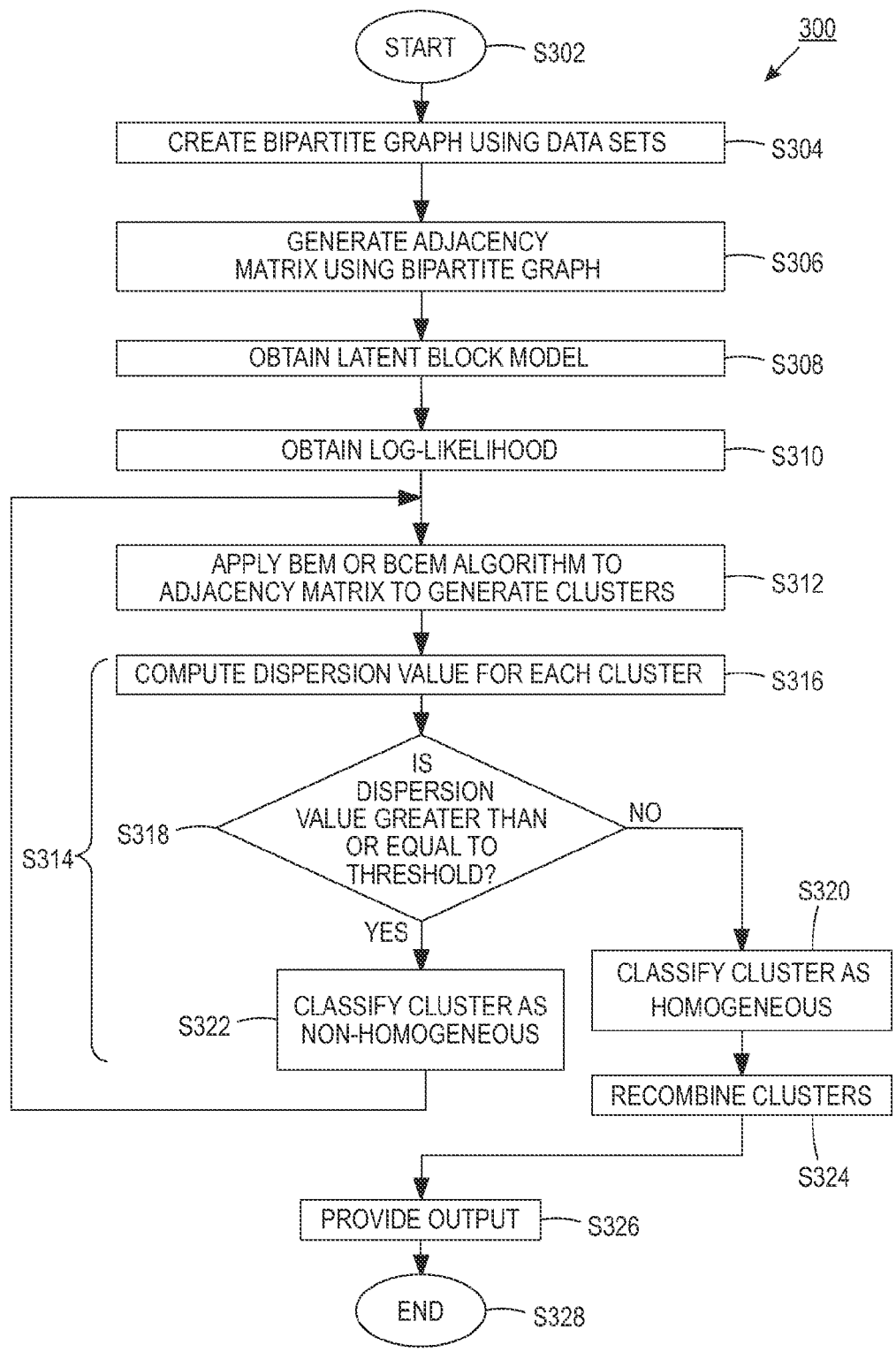
FIG. 3 shows a flow chart illustrating a method 300 for generating homogeneous clusters.

One aspect of the present system 200 is that it not only generates clusters; it verifies homogeneity of clusters when more than one dataset is being considered. FIG. 3 shows a flow chart illustrating a method 300 generating homogeneous clusters. The method starts at S302. The system identifies student clusters and associated metadata that includes characteristics of each student within each student cluster. While there is no limit to the type of data used by the presently disclosed system and method for generating clusters, the illustrative example clusters students based on assessment data (collectively referred to as "student assessment data"). In other words, the two sets of data being input into the system are (1) students and (2) the assessment data. "Assessment data", as defined herein, can be the answers to questions received on a single or multiple formative assessment(s) provided to the students.

At S304, the transformation module creates bipartite graphs using student assessment data. A bipartite graph, as used herein, includes two sets of nodes—i.e., the students and the assessment data. An edge is drawn from each student to each answer of that student's assessment data that is incorrect. When generated for the group of students (such as a class), the bipartite graph essentially maps every incorrect answer. The analysis of each node enables a user to quickly determine which students answered an assessment question incorrectly.

The article titled "Co-clustering documents and words using Bipartite Spectral Graph Partitioning", by Inderjit S. Dhillon, K D D 2001, incorporated fully by reference herein, explains that a graph G=(V,E) is a set of vertices V={1, 2, . . . , |V|} and a set of edges {i,j} each with edge weight $E_{ij}$. The student assessment data can be represented as a bipartite graph, as described in the disclosure of commonly assigned U.S. Pat. No. 8,718,534, entitled, "System for Co-Clustering of Student Assessment Data", by Srinivas, et al., which is totally incorporated herein by reference. The '534 patent compiles the assessment data received from the formative assessments and creates bipartite relationships in a bipartite graph(s) of student data for each student and the assessment evaluations. In the illustrative example, each row of the bipartite graph corresponds with a student and each column corresponds with assessment data of the student.

At S306, the bipartite data is transformed into an adjacency matrix. Using the bipartite graph, the adjacency mapping module maps adjacency relationships between students and the assessment data by creating a matrix representing the relationships as binary data. However the matrix can be adapted to different forms of data, such as, continuous data, contingency data as well as categorical data, by using different latent block models. The adjacency matrix identifies a relationship of one of the rows and columns of the table to metadata associated with a second of the rows and columns.

Figure 4:
FIG. 4 shows an illustrative adjacency matrix representing the student assessment data in binary form.

FIG. 4 shows an illustrative adjacency matrix 400 representing the student assessment data as binary data type. In the adjacency matrix $X_{ij}$ of FIG. 4, the variables in rows (I) represent students and the variables in columns (J) represent answers to questions. The data in $i^{th}$ row and $j^{th}$ column is represented as "1" if the student answered the question incorrectly and "0" otherwise. The edges {i, j} in a bipartite graph represent an incorrect answer.

In some embodiments, the relationship between students and items may already be described as an adjacency matrix form.

Returning to FIG. 3, the co-clustering module obtains a latent block model at S308 to cluster the data represented in the adjacency matrix. The algorithm applied by the co-clustering module to obtain the latent block model is based on the data type represented in the adjacency matrix. Because the illustrative adjacency matrix of FIG. 4 is shown in binary form, the illustrative algorithm is a Bernoulli latent block model with a probability density function, represented by the equation:

$$f(x;\theta)=\Sigma_{(z,w)\in ZW}\Pi_{i,k}\pi_k^{z_{ik}}\Pi_{i,k}\rho_l^{w_{jl}}\Pi_{i,j,k,l}\varphi(x_{ij};\alpha_{kl})^{z_{ik}w_{jl}} \quad (1)$$

where $\alpha_{kl}\in(0, 1)$ and $\varphi(x_{ij}; \alpha_{kl})=(\alpha_{kl})^x (1-\alpha_{kl})^{1-x}$.

Next, the co-clustering module applies a maximum likelihood approach to the model at S310. To apply the maximum likelihood approach to the model, the log-likelihood $L_C(z,w,\theta)=\log f(x,z,w;\theta)$ can be written as the following equation:

$$L_C(z,w,\theta)=\Sigma_{i,k}z_{ik} \log \pi_k \Sigma_{j,l} w_{jl} \log \rho_l \Sigma_{i,j,k,l} z_{ik} w_{jl} \log \varphi(x_{ij};\alpha_{kl}) \qquad (2)$$

Continuing with FIG. 3, the log likelihood is used to cluster the two sets of data. Mainly, at S312, a block expectation maximization (BEM) or block classification expectation maximization (BCEM) algorithms is iteratively applied to the rows and columns of the adjacency matrix to simultaneously cluster the students and the assessment data. However, the system receives as input, prior to applying the algorithms, a desired number of clusters. For example, the input can specify a number of clusters for each data set. In one example, should the user desire the students be broken into two groups and the assessment results be broken into two groups, such input can be 2×2. In such an example, the output is four clusters. However, the clusters do not have to be equal in size. The desired number of clusters can be broken down for each data set.

Figures 5A, 5B:
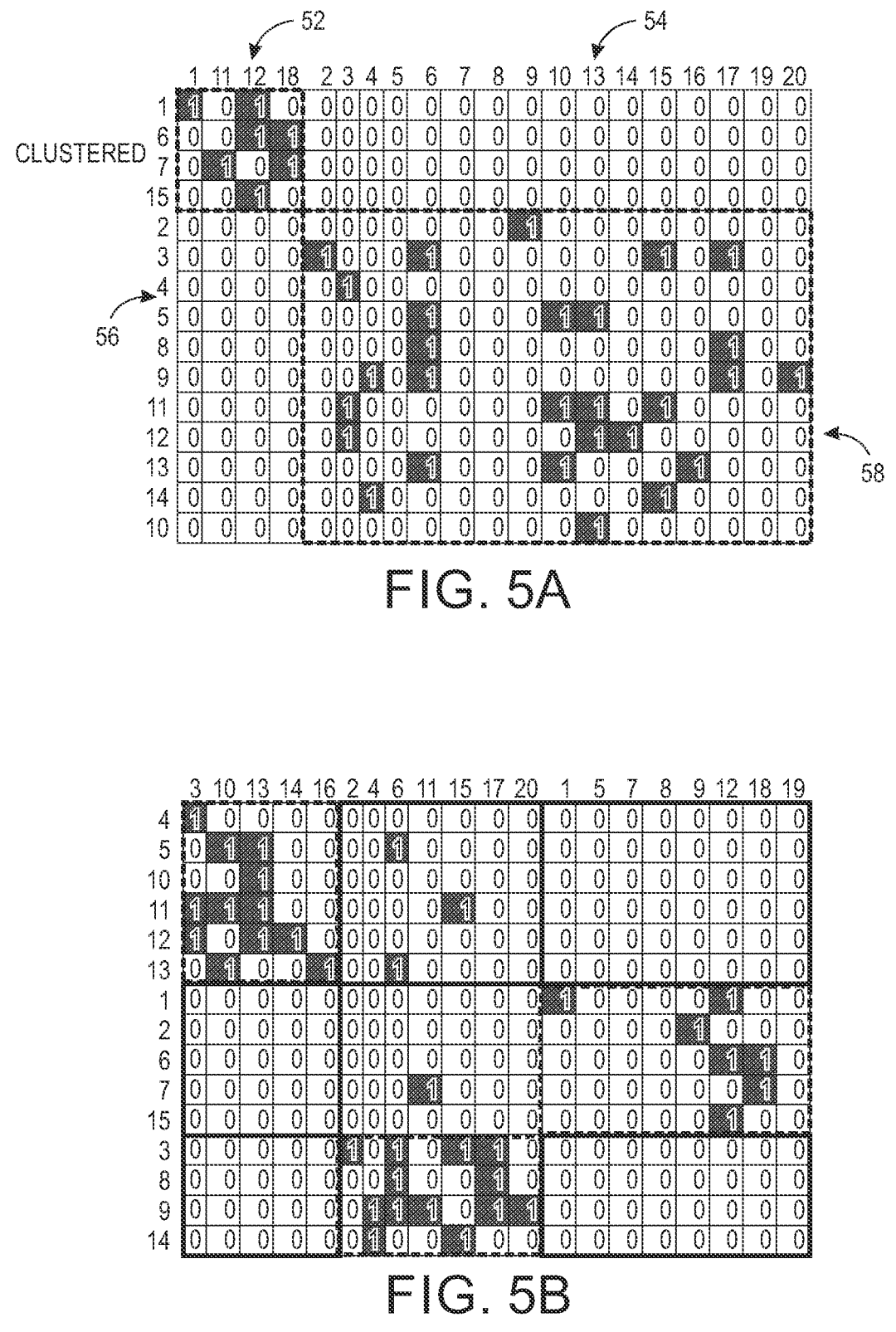
Figures 5C, 5D:
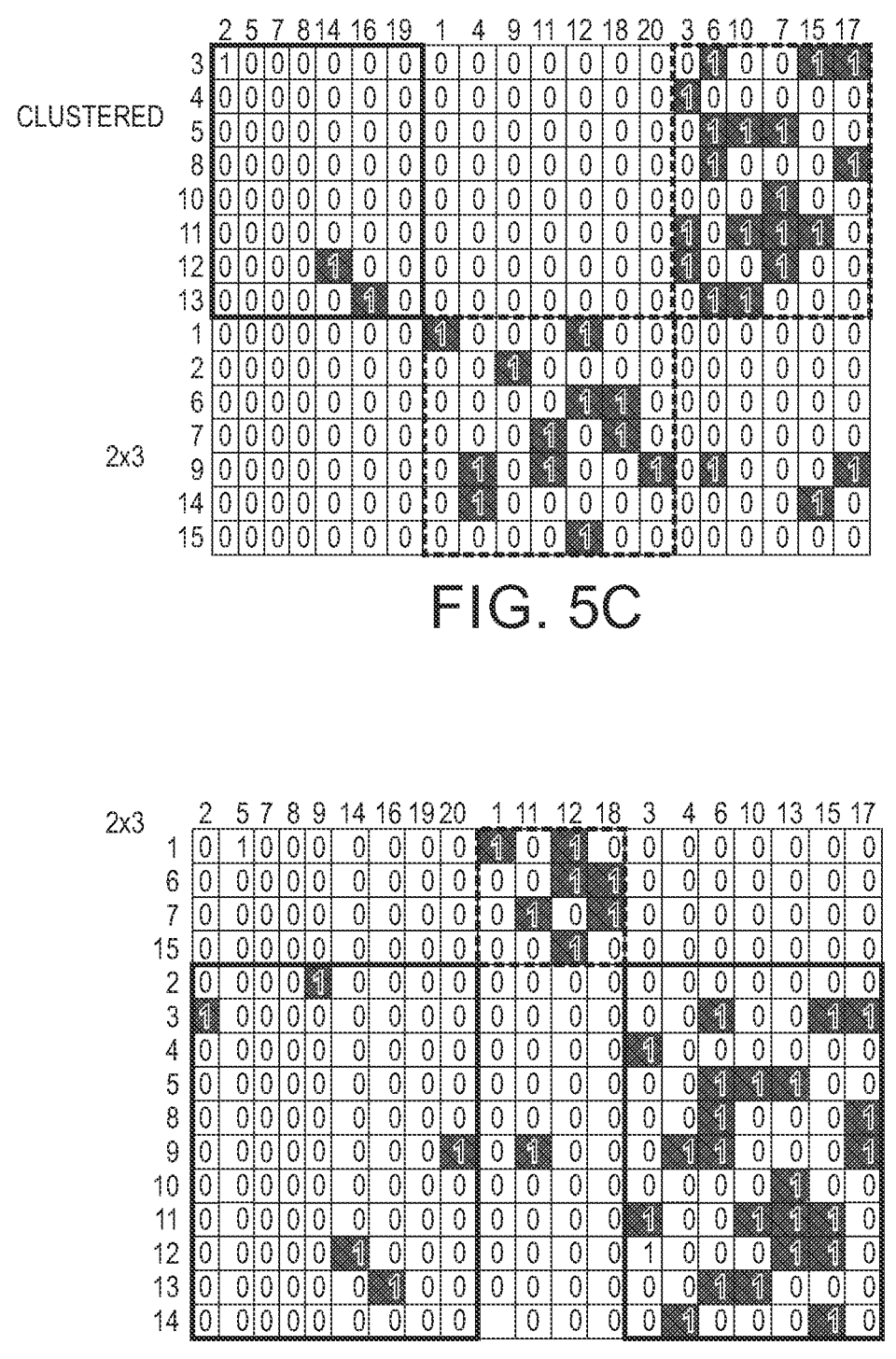

The algorithm is applied to the adjacency matrix iteratively until the log-likelihood, $L_C(\theta)$ reaches an optimum (or converges). Using the adjacency matrix 400 shown in FIG. 4, for example, the algorithm is run on a first one of the rows and columns and then the second one of the rows and columns. Then, the algorithm is run again on the rows and/or columns until the log-likelihood $L_C(\theta)$ is converged. FIG. 5A shows the block clustering output using the adjacency matrix of FIG. 4 for a desired number of clusters being 2×2. As illustrated in FIG. 5, students 1, 6, 7, and 15 are clustered in one group and the remaining students are clustered together in a different group such that the students are divided into two clusters based on the desired number input. These students are clustered together based on a similarity of answers in the assessment data. The assessment responses are also clustered into two groups. For example, the students of the first cluster—1, 6, 7 and 15—the correct answers for 16 assessment questions. Altogether, the adjacency matrix is divided into four clusters, hereinafter referred to as "blocks". FIG. 5B shows the block clustering output using the adjacency matrix of FIG. 4 for a desired number of clusters being 3×3, or nine blocks. FIGS. 5C and 5D show different, possible using the adjacency matrix of FIG. 4 for a desired number of clusters being 2×3, or six blocks.

In other words, the log-likelihood $L_C(\theta)$ is maximized iteratively by estimating model parameters, $\theta$ and then maximizing the conditional expectation of the complete data log-likelihood, $L_C(z,w,\theta)$. The resulting values are used to seed the next iteration.

One aspect of the present disclosure is a verification process checks the quality, i.e., homogeneity, of the clusters. Returning to FIG. 3, the co-clustering module 220 checks the validity for each block identified during the clustering phase at S314. For each block (k,l) the module 220 computes a dispersion value (or rate) at S316. The dispersion value represents the probability of the block having a different value than the block's center.

In the illustrative example, where the adjacency matrix is represents relationships in binary data, the dispersion value is a model density of a cluster computed using the equation:

$$\varphi(x_{ij};\alpha) = (\varepsilon_{kl})^{|x_{ij}-\alpha_{kl}|}(1-\varepsilon_{kl})^{1-|x_{ij}-\alpha_{kl}|} \qquad (3)$$

$$\text{where } \begin{cases} \alpha_{kl}=0, \varepsilon_{kl}=p_{kl} \text{ if } p_{kl}<0.5 \\ \alpha_{kl}=1, \varepsilon_{kl}=1-p_{kl} \text{ if } p_{kl}>0.5 \end{cases}$$

wherein the binary value, $\alpha_{kl}$, acts as the center of the block k, l and gives the most frequent binary value for each block. The value $\varepsilon_{kl}$, characterizes the dispersion of the block k, l. In the embodiment, the dispersion value $\varepsilon_{kl}$ falls within the range between 0 and 0.5. A value of 0.5 represents a block with equal binary numbers of 0s and 1s. A value of 0 represents a block comprised entirely of 0s or entirely of 1s. In other words, the value represents a ratio of incorrect answers (1s) relative to the total number of answers in the block.

The dispersion value computed using equation 3 for the four clusters or blocks generated in FIG. 5A is described below. The first cluster 52 has a value of 0.1591 because there are 7 incorrect answers to 9 correct answers. A second cluster 54 has a dispersion value of 0, a third cluster 56 has a dispersion value of 0.0227 because only there is only one binary "1" number among 44 total cells. A fourth cluster 58 has a dispersion value of 0.4375 because there are 27 incorrect answers to 176 total cells in the block.

In another embodiment, where the adjacency matrix is represents relationships as continuous data, the dispersion value is a mean or variance of a block computed using the equation:

$$(x_{ij};\alpha) = \frac{1}{\sqrt{2\pi\sigma_{kl}^2}} e^{-\left(\frac{1}{2\sigma_{kl}^2}(x_{ij}-\mu_{kl})^2\right)} \qquad (4)$$

wherein the continuous value $\alpha=(\alpha_{11},\ldots,\alpha_{gm})$ and wherein $\alpha_{kl}=(\mu_{kl},\sigma_{kl}^2)$ is the mean and variance of the block k, l.

In a further embodiment, where the adjacency matrix is represents relationships as contingency data, the dispersion value is a model density of a cluster computed using the equation:

$$\varphi(x_{ij};\alpha) = \frac{e^{-\mu_i v_j \gamma_{kl}}(\mu_i v_j \gamma_{kl})^{x_{ij}}}{x_{ij}!} \qquad (5)$$

wherein the contingency value $\alpha=(\mu, v, \gamma)$; wherein $\mu_i$ and $v_j$ are the effects of the row l and column j respectively and $\gamma_{kl}$ the effect of the block k, l.

Continuing with FIG. 3, the dispersion value computed for each block is compared to a predetermined threshold at S318. The threshold is an expected value set by the user and represents a minimum amount of homogeneity desired for a cluster. For example, the threshold input by the user can represent the amount of difference a teacher or educator will accept in a block. This input drives the decision on whether the algorithm needs to be run on a subset of the original matrix.

In other words, the thresholding at S318 is used by the module 220 to identify clusters or blocks that do not meet the level of homogeneity desired by the user. The higher the dispersion value, the less uniform the corresponding cluster is. Therefore, in response to the dispersion value being less than the predetermined threshold (NO at S318), associate the cluster as being homogeneous at S320. In response to the dispersion value being greater than or equal to the predetermined threshold (YES at S320) associate the cluster as not being homogeneous at S322.

In response to at least one cluster not being homogeneous at S320, the module 220 continues to apply the algorithm to the set of non-homogenous clusters within the data set to regroup the data corresponding to the non-homogeneous clusters. The reclustering can be performed simultaneous to the original clustering process.

In the example, for illustrative purposes only, a non-limiting threshold value can be set to 0.3 by the user before the clustering. Therefore, cluster 58 in FIG. 5 is classified as being nonhomogeneous after the thresholding and becomes a candidate for further clustering. FIG. 6 shows a localized matrix representing the nonhomogeneous, original cluster 58 (FIG. 5) after it is reclustered. FIG. 6 shows that two clusters 62, 64 were generated in the reclustering operation. The dispersion values are 0.051 and 0.29 for clusters 62 and 64, respectively, each of which fall below the 0.3 threshold value set by the user. Mainly S314 repeated until the dispersion value of the resulting cluster (i.e., subcluster of original cluster) falls below the threshold minimum for homogeneity. In other words, the clustering at S314 is iteratively repeated until each cluster resulting from the data set is homogeneous.

Returning to FIG. 3, when all the clusters meet the minimum homogeneity requirements, at S324, the permutation module 222 recombines the clustered blocks. In other words, the module 222 recombines the homogenous clusters removed before the localized clustering of the non-homogeneous clusters and the homogeneous (sub-) clusters generated after the reclustering of the non-homogeneous clusters. The module 222 combines all the blocks and then reorders the rows and columns so that the identified blocks are kept together sequentially. In other words, the module rebuilds the adjacency matrix.

In other words, the clusters 52-56 of FIG. 5 are recombined with the localized clusters 62-64 of FIG. 6 for a total of six clusters. As part of the permutation process, the rows and columns are reordered sequentially. For example, the assessments 2, 5, 7, 8, 9, 14, 16, 19, and 20, belonging to cluster 62 are moved in front of the remaining assessments in original cluster 58.

In a further embodiment, the dispersion values of adjacent blocks can be compared to each other. Adjacent blocks can be combined to form one cluster if their respective dispersion values are identical or are close enough such that the difference between the adjacent blocks' dispersion values meets a minimum difference threshold. The final combination is generated based on the previously calculated dispersion values.

FIG. 7 shows five total clusters generated from the original adjacency matrix of FIG. 3. These clusters include 52 and 56 from FIG. 5, cluster 64 from FIG. 6. However, the assessments 2, 5, 7, 8, 9, 14, 16, 19, and 20 of cluster 54 in FIG. 5 and cluster 62 in FIG. 6 are combined to form a new cluster 72. The remaining items in original cluster 62 now make a fifth cluster 74. The greater the difference between dispersion values of adjacent blocks, the more distinct are the blocks' make-up. For example, the difference between dispersion values of cluster 64 of FIG. 6 and cluster 54 of FIG. 5 is too large to combine them.

Continuing with FIG. 3, the system 100 notifies the user at S326 of the clusters or related results via a display at the user device 110. In one embodiment, at least one data set includes metadata related to a characteristic of the data set. In the illustrative embodiment, the assessment data can include metadata that corresponds with an educational concept. Therefore, the output to the user device can include the students assigned to a cluster and information related to the educational concept. For example, the metadata associated with the assessment items assigned to the cluster can identify items that the students of the cluster struggle with, or a concept that the students of the cluster struggle with. In a different embodiment, such metadata can indicate distractors that cause confusion among the students in the corresponding cluster. There is no limitation to the information contained in the metadata. A combination of results can be provided to the user. By verifying the homogeneity of clusters, the user can personalize instruction to a group of students with similar needs. The method ends at S328.

One aspect of the present disclosure is that the simultaneous clustering operation provides greater flexibility than the original block clustering approach. Particularly, by recombining clusters and reordering the clusters, adjacent clusters can be recombined if the dispersion values are identical or close to a threshold.

Although the control method 300 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 200, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for verifying homogeneity in clusters, the system comprising:
 a processor; and
 a non-transitory computer readable memory storing instructions that are executable by the processor to include:
  an adjacency mapping module that creates at least one adjacency matrix representing a relationship between rows and columns of a table;
  a co-clustering module that applies an algorithm to the table to identify a first set of clusters, the clustering module further operative to:
   (a) compute for each identified cluster a dispersion value of the cluster,
   (b) for the each identified cluster, compare the dispersion value to a predetermined threshold,
   (c) in response to the dispersion value being less than the predetermined threshold, associate the cluster as being homogeneous,
   (d) in response to the dispersion value being greater than or equal to the predetermined threshold, associate the cluster as not being homogeneous,
   (e) continue applying the algorithm to the set of non-homogenous clusters within the data set to regroup the clusters, and (f) repeat (a)-(e) until each cluster resulting from the data set is homogeneous and a predetermined number of clusters is reached.

2. The system of claim 1, further comprising:
a permutation module that recombines the removed clusters with the re-grouped clusters sequentially while keeping the each identified cluster together.

3. The system of claim 1, wherein the predetermined threshold represents a minimum amount of homogeneity desired for a cluster.

4. The system of claim 1, wherein in response to the adjacency matrix being represented as binary data, the dispersion value $\varepsilon_{kl}$ is a model density of a cluster computed using the equation:

$$\varphi(x_{ij};\alpha) = (\varepsilon_{kl})^{|x_{ij}-\alpha_{kl}|}(1-\varepsilon_{kl})^{1-|x_{ij}-\alpha_{kl}|}$$

$$\text{where } \begin{cases} \alpha_{kl}=0, \varepsilon_{kl}=p_{kl} \text{ if } p_{kl}<0.5 \\ \alpha_{kl}=1, \varepsilon_{kl}=1-p_{kl} \text{ if } p_{kl}>0.5 \end{cases}$$

wherein a binary value $\alpha_{kl}$, acts as a center of the cluster k, l.

5. The system of claim 1, wherein in response to the adjacency matrix being represented as continuous data, the dispersion value is one of a mean and variance of a cluster computed using the equation:

$$(x_{ij};\alpha) = \frac{1}{\sqrt{2\pi\sigma_{kl}^2}} e^{-\left(\frac{1}{2\sigma_{kl}^2}(x_{ij}-\mu_{kl})^2\right)}$$

wherein a continuous value $\alpha=(\alpha_{11},\ldots,\alpha_{gm})$, wherein $\alpha_{kl}=(\mu_{kl},\sigma_{kl}^2)$ is the mean or variance of the cluster.

6. The system of claim 1, wherein in response to the adjacency matrix being represented as contingency data, the dispersion value is a model density of a cluster computed using the equation:

$$\varphi(x_{ij};\alpha) = \frac{e^{-\mu_i v_j \gamma_{kl}}(\mu_i v_j \gamma_{kl})^{x_{ij}}}{x_{ij}!}$$

wherein a contingency value $\alpha=(\mu,v,\gamma)$ and wherein $\mu_i$ and $v_j$ are effects of a row l and column j of the adjacency matrix and $\gamma_{kl}$ is an effect of the cluster k, l.

7. The system of claim 1, further comprising:
a transformation module that creates bipartite graphs using the table;
the adjacency mapping module creates the at least one adjacency matrix from the bipartite graphs, the at least one adjacency matrix identifies a relationship of one of the rows and columns of the table to metadata associated with a second of the rows and columns.

8. The system of claim 1, wherein each row corresponds with a student and each column corresponds with assessment data of the student.

9. The system of claim 8, wherein at least one of the student and assessment data includes metadata related to a characteristic of the one student and assessment data, wherein the metadata corresponds with an educational concept and is selected from a group consisting of:
associated items that the students in a corresponding cluster struggle with;
an associated concept the students in the corresponding cluster struggle with;
associated distractors that cause confusion among the students in the corresponding cluster; and
a combination of the above.

10. The system of claim 1, wherein the algorithm is a log-likelihood $L_C(z, w, \theta) = \log f(x, z, w; \theta)$ using the equation:

$$L_C(z,w,\theta) = \sum_{i,k} z_{ik} \log \pi_k \sum_{j,l} w_{jl} \log \rho_l \sum_{i,j,k,l} z_{ik} w_{jl} \log(x_{ij}; \alpha_{kl}).$$

11. The system of claim 1, wherein the co-clustering module applies the algorithm iteratively until a log-likelihood meets a predetermined maximum corresponding with a desired homogeneity.

12. A method for verifying a desired homogeneity in clusters, the method comprising:
(a) computing for each identified cluster a dispersion value of the cluster;
(b) for the each identified cluster, comparing the dispersion value to a predetermined threshold;
(c) in response to the dispersion value being less than the predetermined threshold, associating the cluster as being homogeneous;
(d) in response to the dispersion value being greater than or equal to the predetermined threshold, associating the cluster as not being homogeneous;
(e) continuing applying the algorithm to the set of non-homogenous clusters within the data set to regroup the clusters; and,
(f) repeating (a)-(e) until each cluster resulting from the data set is homogeneous and a predetermined number of clusters is reached.

13. The method of claim 12 further comprising:
recombining the rest of the clusters with the re-grouped clusters sequentially while keeping the each identified cluster together.

14. The method of claim 12, wherein the predetermined threshold represents a minimum amount of homogeneity desired for a cluster.

15. The method of claim 12, wherein in response to the adjacency matrix being represented as binary data, the dispersion value $\varepsilon_{kl}$ is a model density of a cluster computed using the equation:

$$\varphi(x_{ij};\alpha) = (\varepsilon_{kl})^{|x_{ij}-\alpha_{kl}|}(1-\varepsilon_{kl})^{1-|x_{ij}-\alpha_{kl}|}$$

$$\text{where } \begin{cases} \alpha_{kl}=0, \varepsilon_{kl}=p_{kl} \text{ if } p_{kl}<0.5 \\ \alpha_{kl}=1, \varepsilon_{kl}=1-p_{kl} \text{ if } p_{kl}>0.5 \end{cases}$$

wherein a binary value $\alpha_{kl}$ acts as a center of the cluster k, l.

16. The method of claim 12, wherein in response to the adjacency matrix being represented as continuous data, the dispersion value is one of a mean and variance of a cluster computed using the equation:

$$(x_{ij};\alpha) = \frac{1}{\sqrt{2\pi\sigma_{kl}^2}} e^{-\left(\frac{1}{2\sigma_{kl}^2}(x_{ij}-\mu_{kl})^2\right)}$$

wherein the continuous value $\alpha=(\alpha_{11},\ldots\alpha_{gm})$ and wherein $\alpha_{kl}=(\mu_{kl},\sigma_{kl}^2)$ is the one of the mean and variance of the cluster k, l.

17. The method of claim 12, wherein in response to the adjacency matrix being represented as contingency data, the dispersion value is a model density of a cluster computed using the equation:

$$\varphi(x_{ij}; \alpha) = \frac{e^{-\mu_i v_j \gamma_{kl}}(\mu_i v_j \gamma_{kl})^{x_{ij}}}{x_{ij}!}$$

wherein a contingency value $\alpha=(\mu, v, \gamma)$ and wherein $\mu_i$ and $v_j$ are the effects of a row l and column j, and wherein $\gamma_{kl}$ the effect of the cluster k, l.

18. The method of claim 12 further comprising:
acquiring a table, where at least one of rows and columns includes metadata related to a characteristic of the one of the rows and columns;
creating bipartite graphs using the table; and
creating the at least one adjacency matrix from the bipartite graphs, the at least one adjacency matrix identifies a relationship of one of the rows and columns to the metadata associated with a second of the rows and columns.

19. The method of claim 12, wherein the each row corresponds with a student data and each column corresponds with assessment data.

20. The method of claim 19, wherein at least one of the student and assessment data includes metadata related to a characteristic of the one student and assessment data, wherein the metadata corresponds with an educational concept and is selected from a group consisting of:
associated items that the students in a corresponding cluster struggle with;
an associated concept the students in the corresponding cluster struggle with;
associated distractors that cause confusion among the students in the corresponding cluster; and
a combination of the above.

21. The method of claim 12, wherein the algorithm is a log-likelihood $L_C(z,w, \theta)=\log f(x, z, w; \theta)$ using the equation:

$$L_C(z, w, \theta) = \sum_{i,k} z_{ik} \log \pi_k \sum_{j,l} w_{jl} \log \rho_l \sum_{i,j,k,l} z_{ik} w_{jl} \log(x_{ij}; \alpha_{kl}).$$

22. The method of claim 12 further comprising:
applying the algorithm iteratively until a log-likelihood meets a predetermined maximum corresponding with a desired homogeneity.

23. A system for educational assessment of student groups, the system comprising:
a processor; and
a non-transitory computer readable memory storing instructions that are executable by the processor to include:
an adjacency mapping module that creates at least one adjacency matrix representing a relationship between student data and assessment data, wherein the assessment data includes metadata corresponding with an associated educational concept;
a co-clustering module that applies an algorithm to the student and assessment data to identify a first set of clusters, the clustering module further operative to:
(a) compute for each identified cluster a dispersion value of the cluster,
(b) for the each identified cluster, compare the dispersion value to a predetermined threshold,
(c) in response to the dispersion value being less than the predetermined threshold, associate the cluster as being homogeneous,
(d) in response to the dispersion value being greater than or equal to the predetermined threshold, associate the cluster as not being homogeneous,
(e) continue applying the algorithm to the clusters that are identified as not being homogeneous in the data set to recluster the clusters, and
(f) repeat (a)-(e) until each cluster resulting from the algorithm is a homogeneous cluster and a predetermined number of clusters is reached; and,
for the each homogeneous cluster, determine the associated educational concept that students in the corresponding cluster struggle with.

24. The system of claim 23, wherein the algorithm is a log-likelihood $L_C(z,w, \theta)=\log f(x, z, w; \theta)$ using the equation:

$$L_C(z, w, \theta) = \sum_{i,k} z_{ik} \log \pi_k \sum_{j,l} w_{jl} \log \rho_l \sum_{i,j,k,l} z_{ik} w_{jl} \log(x_{ij}; \alpha_{kl})$$

and wherein the algorithm iteratively until a log-likelihood meets a predetermined maximum corresponding with a desired homogeneity.

* * * * *